(12) United States Patent
Zandifar

(10) Patent No.: US 7,783,107 B2
(45) Date of Patent: Aug. 24, 2010

(54) CHARACTERIZATION OF A PRINTED DROPLET

(75) Inventor: Ali Zandifar, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 326 days.

(21) Appl. No.: 11/851,154

(22) Filed: Sep. 6, 2007

(65) Prior Publication Data

US 2009/0066971 A1  Mar. 12, 2009

(51) Int. Cl.
G06K 9/34 (2006.01)
(52) U.S. Cl. .................. 382/173; 358/1.9
(58) Field of Classification Search .......... None
See application file for complete search history.

(56) References Cited

U.S. PATENT DOCUMENTS

| | | | | |
|---|---|---|---|---|
| 4,638,373 | A * | 1/1987 | Logan | 358/3.03 |
| 5,291,535 | A * | 3/1994 | Baker et al. | 378/22 |
| 5,418,865 | A * | 5/1995 | Bloomberg | 382/312 |
| 5,469,267 | A * | 11/1995 | Wang | 358/3.21 |
| 5,561,696 | A * | 10/1996 | Adams et al. | 378/58 |
| 5,570,298 | A * | 10/1996 | Suzuki et al. | 382/170 |
| 5,600,350 | A | 2/1997 | Cobbs et al. | |
| 5,621,811 | A * | 4/1997 | Roder et al. | 382/147 |
| 5,649,073 | A * | 7/1997 | Knox et al. | 358/1.9 |
| 5,757,953 | A * | 5/1998 | Jang | 382/132 |
| 5,835,108 | A | 11/1998 | Beauchamp et al. | |
| 5,856,836 | A * | 1/1999 | Silverbrook | 347/55 |
| 5,866,895 | A * | 2/1999 | Fukuda et al. | 235/494 |
| 6,018,590 | A * | 1/2000 | Gaborski | 382/168 |
| 6,139,134 | A * | 10/2000 | Ando et al. | 347/84 |
| 6,196,652 | B1 | 3/2001 | Subirada et al. | |
| 6,263,091 | B1 * | 7/2001 | Jain et al. | 382/125 |
| 6,266,439 | B1 * | 7/2001 | Pollard et al. | 382/164 |
| 6,282,317 | B1 * | 8/2001 | Luo et al. | 382/203 |
| 6,312,120 | B1 * | 11/2001 | Ando et al. | 347/95 |
| 6,360,010 | B1 * | 3/2002 | Hu et al. | 382/180 |
| 6,363,162 | B1 * | 3/2002 | Moed et al. | 382/112 |
| 6,415,062 | B1 * | 7/2002 | Moed et al. | 382/260 |
| 6,461,626 | B1 * | 10/2002 | Rabe et al. | 424/401 |
| 6,485,124 | B1 | 11/2002 | King et al. | |
| 6,554,390 | B2 | 4/2003 | Arquilevich et al. | |
| 6,629,746 | B2 * | 10/2003 | Waldner et al. | 347/19 |
| 6,631,963 | B1 * | 10/2003 | Ando et al. | 347/15 |
| 6,686,966 | B1 | 2/2004 | Hashimoto | |
| 6,883,892 | B2 | 4/2005 | Sievert et al. | |
| 7,030,351 | B2 | 4/2006 | Wasserman et al. | |
| 7,162,073 | B1 * | 1/2007 | Akgul et al. | 382/149 |
| 7,263,227 | B2 * | 8/2007 | Simard | 382/195 |
| 7,277,570 | B2 * | 10/2007 | Armstrong | 382/141 |
| 7,376,275 | B2 * | 5/2008 | Simard et al. | 382/218 |
| 2004/0008272 | A1 | 1/2004 | Tang | |
| 2005/0012847 | A1 | 1/2005 | Nakajima et al. | |
| 2006/0215750 | A1 | 9/2006 | Izawa | |

(Continued)

OTHER PUBLICATIONS

Allebach et al., IEEE 2002, "Image Analysis as a tool for Printer characterization and halftoning algorithm development" (pp. 1-6).*

*Primary Examiner*—Manav Seth

(57) ABSTRACT

Systems, apparatuses, and methods are described for characterizing the quality of a printed droplet(s) produced by a printer. The analysis of the printed droplet(s) is performed by applying image processing and computational geometric techniques. A report generated from that analysis enables the determination of characteristics of the device that produced the printed droplets.

12 Claims, 6 Drawing Sheets

U.S. PATENT DOCUMENTS

2007/0071328 A1* 3/2007 Larsen et al. ............... 382/225
2007/0292028 A1* 12/2007 Simard ....................... 382/180
2008/0031521 A1* 2/2008 Can et al. ................... 382/173
2008/0205759 A1* 8/2008 Zandifar et al. ............. 382/177

* cited by examiner

CHARACTERIZATION OF A PRINTED DROPLET

BACKGROUND

A. Technical Field

The present invention pertains generally to image processing, and relates more particularly to characterization of a droplet.

B. Background of the Invention

Printing technology is an important component of applications such as printed circuit board (hereafter, "PCB") generation. Typically, PCB masks are printed by inkjet printers. It is important to be able to calibrate such printers as well as perform quality control in order to insure that their printing performance is consistent and meets specifications.

An inkjet printer head contains a set of nozzles. It is possible to characterize each nozzle's "signature" in terms of how it reproduces a calibration input pattern. One example of a calibration input pattern is a dot; a nozzle's rendering of the dot is a "droplet." Major components of a nozzle's droplet signature include circularity, elongation, and splash.

Building a quantitative model of characteristics of a droplet signature is a valuable tool in managing the quality of devices that generate these droplets. For example, nozzle signature characterization can be used in a variety of quality control tests. A nozzle's output can be compared to its calibration signature in order to determine whether it has become clogged or is otherwise malfunctioning. In another example, two printer heads can be tested for compatibility by comparing the signatures of their nozzles and quantifying similarity or differences. This kind of test may be important for applications that require the use of multiple printer heads.

One skilled in the art will recognize the vast applicability of droplet, or other printed shape, characterization across numerous markets and devices.

SUMMARY OF THE INVENTION

Systems, apparatuses, and methods are described for performing an analysis of printed droplets. In various embodiments, a "droplet" is a print of a dot within a calibration dot pattern that is input to the printer. The analysis of a printed droplet or droplets is performed by applying image processing and computational geometric techniques. A report generated from that analysis characterizes the quality of the printed droplet(s). In various embodiments, a report of that analysis may characterize the quality of the nozzles on the printer head of an inkjet printer in terms of the quality of the printed droplet(s).

In certain embodiments, an inkjet printer prints an image of a calibration dot pattern. The printer may have software configured to control which nozzle prints a specified region of the calibration pattern. In various embodiments, snapshot images with microscopic resolution of various regions of a printed dot pattern may be generated by an image capture system. The snapshot images are segmented into binary segmented images in which the pixels are identified as either foreground pixels that represent the regions containing printed dots, or background pixels.

A method for characterizing a printed droplet within an image comprises segmenting the image into foreground pixels and background pixels, defining a plurality of connected components within the image, identifying the printed droplet by associating adjacent connected components that are within a threshold distance, and analyzing the printed droplet by quantifying at least one droplet image property.

A droplet may be identified by performing a fast grouping analysis on the connected components within the image. A fast grouping analysis comprises overlaying a 2 dimensional indexing grid onto the image, labeling the connected components within the image, and then identifying droplets by associating adjacent labeled components located within a neighborhood of one cell of the indexing grid.

Analyzing statistical properties of droplets in a set of droplets comprises calculating image properties of droplets in the set and then applying statistical analysis to the image properties of the droplets. In various embodiments, image properties of a droplet comprise dot-coverage percentage (the percentage of the pixels labeled as belonging to the droplet among pixels of the image within the area of the minimum bounding circle enclosing the droplet), and circularity (the width to height ratio of the minimum bounding rectangle enclosing the droplet).

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Systems, apparatuses, and methods are described for characterizing the quality of a printed droplet(s) produced by a printer. The analysis of the printed droplet(s) is performed by applying image processing and computational geometric techniques. A report generated from that analysis enables the determination of characteristics of the device that produced the printed droplets.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

A. System Implementations

Figure 1:
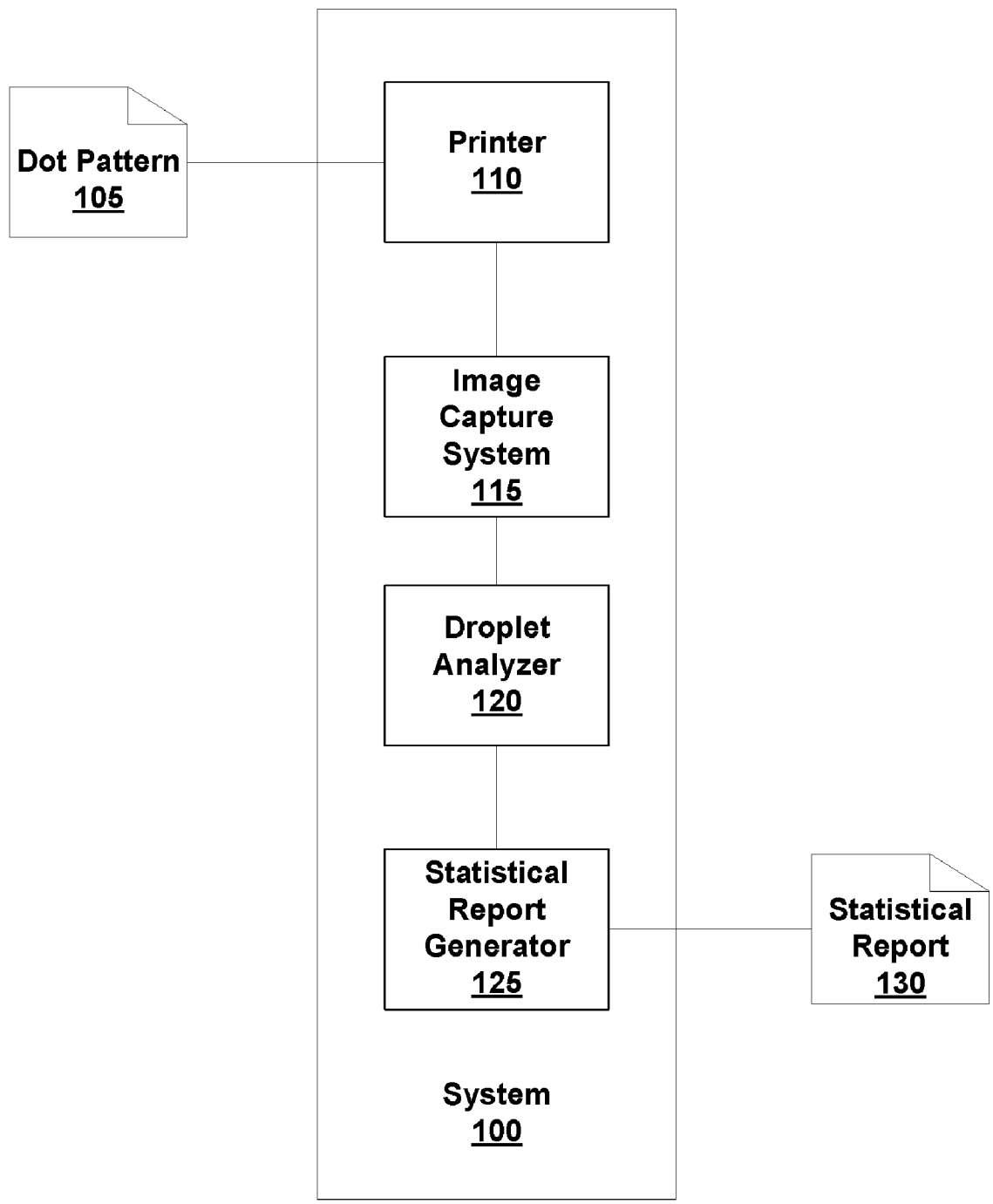
FIG. 1 depicts a block diagram of a system for generation and analysis of printed droplets according to various embodiments of the invention.

FIG. 1 depicts a system 100 for characterizing the quality of printed droplets according to various embodiments of the invention. The system comprises a printer 110, an image capture system 115, a droplet analyzer 120, and a statistical report generator 125.

Figure 2:
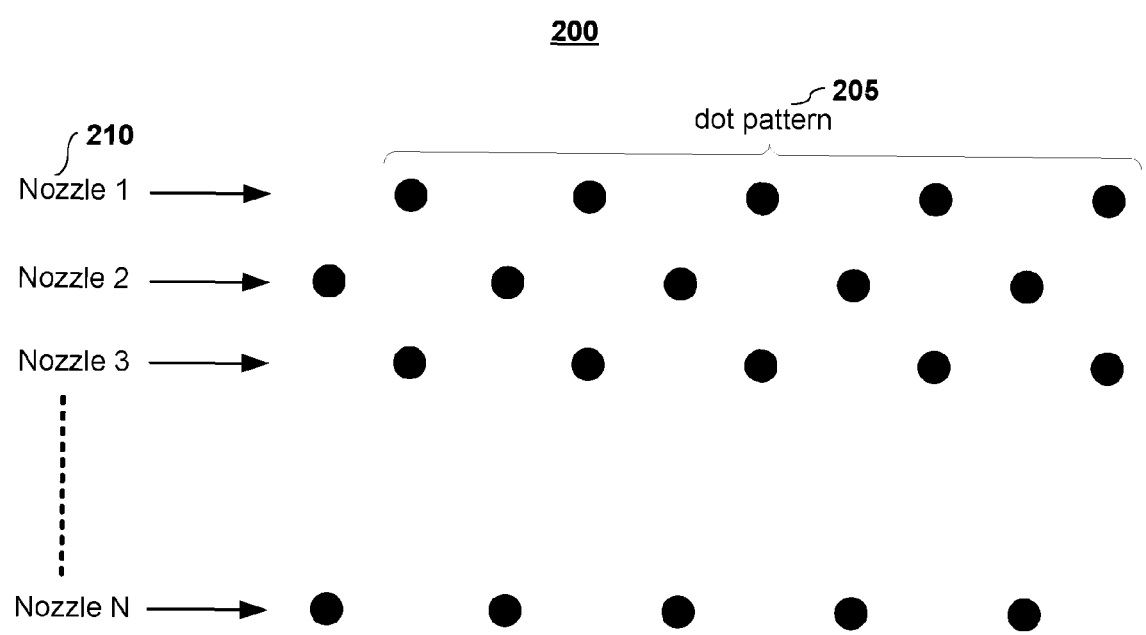
FIG. 2 illustrates an example of a printed dot pattern according to various embodiments of the invention.

In various embodiments, printer 110 receives a dot pattern 105 and produces a printed image of the dot pattern. In various embodiments, printer 110 is an inkjet printer with software that may be configured to control which nozzle prints a specified region of the pattern. FIG. 2 illustrates an example of a printed image of a dot pattern 200 according to various embodiments of the invention. In the example, each row of the dot pattern 205 is printed by a different printer nozzle 210.

In various embodiments, an image capture system 115 receives the printed image of the dot pattern and performs image capture of the printed dot pattern to produce snapshot images of microscopic resolution at different locations of the printed image. In alternative embodiments, a sequence of snapshot images is produced from the printed image. An example of such an image capture system is described in U.S. patent application Ser. No. 11/778,968, entitled "Low Memory Auto-Focus and Exposure System for Large Multi-Frame Image Acquisition," filed Jul. 17, 2007, which is herein incorporated by reference in its entirety.

A droplet analysis is performed on the snapshot images of the printed image received by droplet analyzer 120. Droplet analysis results in computation of the statistical properties of image properties of droplets that are identified within the snapshot images. In alternative embodiments, the analysis may be applied to shapes other than droplets such as lines or corners.

In various embodiments, statistical report generator 125 receives the statistical analysis and produces a statistical report 130 that may contain the signature of each of the printer head nozzles represented in terms of the statistical properties of the droplets it produced.

Figure 3:
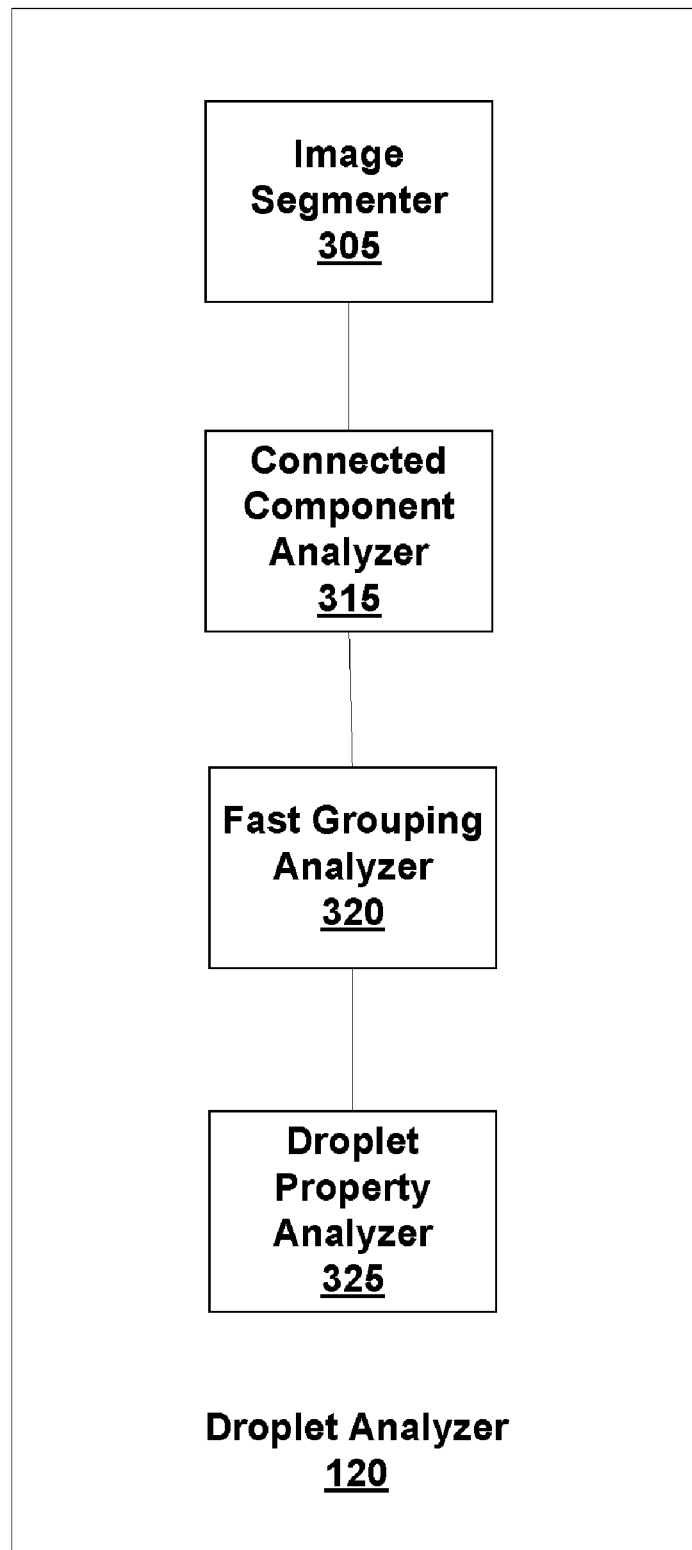
FIG. 3 depicts a block diagram of a droplet analyzer according to various embodiments of the invention.

FIG. 3 depicts a droplet analyzer 120 that receives a snapshot image of the printed image and computes statistical properties of droplets identified within the snapshot image according to various embodiments. Droplet analyzer 120 comprises an image segmenter 305, a connected component analyzer 315, a fast grouping analyzer 320, and a droplet property analyzer 325.

In various embodiments, image segmenter 305 receives a snapshot image of the printed image and segments the image pixels into "foreground" (labeled as "1") and "background" (labeled as "0") regions. Local thresholding techniques may be used to perform segmentation. For example, a threshold may be calculated for each pixel in an image on the basis of information contained in a neighborhood of the pixel. The pixel's threshold value may be compared to the value of a calculated image threshold surface at the pixel's (x,y) location in order to determine the label assigned to the pixel. Those skilled in the art will recognize that there are other local thresholding methods that may be applied in order to perform segmentation, as well as other global thresholding methods.

The foreground pixels represent regions containing the printed dots from the dot pattern. The segmented images are called "binary segmented images" because each pixel may have a 1 label or a 0 label depending upon whether it was determined to be within a foreground region or a background region.

In various embodiments, connected component analyzer 315 receives a binary segmented image, and identifies and labels bounded regions of adjacent foreground pixels within the binary segmented image. In certain embodiments, connected component analyzer 315 performs a Connected Component Analysis (hereafter, "CCA") on each pixel within the image. One example of a CCA is to scan each row of pixels within an image, determining the component label of each pixel in a row. To determine the component label of a pixel, the principle of "8-connectivity" is applied so that the pixel's label is based on the labels of the 8 pixels within a 3-by-3 neighborhood surrounding the pixel. One skilled in the art will recognize that this is an example, and that various methods of CCA may be used on grayscale as well as color multi-layer images. A connected component may be defined as a bounded region enclosing a connected set of foreground pixels.

In various embodiments, fast grouping analyzer 320 receives an image that contains labeled connected components in order to identify and label individual droplets including their possible splash. As previously discussed, splash may appear in a captured image of the droplet and is a result of an ink splash as a nozzle is rendering a dot. In embodiments using CCA, the splash may be labeled as a separate connected component. A "minimum bounding circle" and a "minimum bounding rectangle" may be fitted to a labeled component within an image. A "minimum bounding circle" is the minimum area circle among all circles enclosing a set of points plotted in 2 dimensions. A "minimum bounding rectangle" is the minimum area rectangle among all rectangles enclosing a set of points plotted in 2 dimensions. Fitting a minimum bounding shape to a labeled connected component may result in finding the minimum bounding shape that encloses the pixels labeled as belonging to that component.

In various embodiments, a "fast grouping analysis" is performed in order to identify droplets. In a fast grouping analysis, an indexing grid is overlaid onto an image that has labeled connected components. Each connected component may have a label identifying the indexing grid cell to which it belongs as well as its identifying label. Adjacent connected components that have minimum bounding shapes that are within a threshold distance of each other may be associated into a single droplet. Using both the connected component labels and the indexing grid cell neighborhoods allows this analysis to be performed quickly. One skilled in the art will recognize that various dimensions of the grid and various distance threshold values may be used to perform a fast grouping analysis.

A connected component may be determined to be splash if its distance to another component within a grid cell is less than a distance threshold and both its minimum bounding rectangle and minimum bounding circle have areas that are smaller by a size threshold than the areas of the minimum bounding rectangle and minimum bounding circle that have been fitted to the neighboring component. In embodiments, a minimum bounding box and a minimum bounding rectangle may be re-computed for a droplet that has been labeled as a result of the application of CCA and fast grouping analysis.

In various embodiments, droplet property analyzer 325 receives an image that contains labeled droplets and performs statistical analysis of the droplet image properties for sets of labeled droplets. In embodiments, droplet image properties may comprise "dot-coverage percentage" and "circularity." Dot-coverage percentage is the percentage of foreground pixels among the image pixels within the area of the minimum bounding circle that is fitted to a droplet. A larger dot coverage percentage may be interpreted to mean that less splash is associated with a droplet. Circularity is the width to height ratio of the minimum bounding rectangle that is fitted to a droplet. A droplet is more circular in shape if the circularity is closer to 1.

B. Method for Analyzing an Image of Printed Droplets

Figure 4:
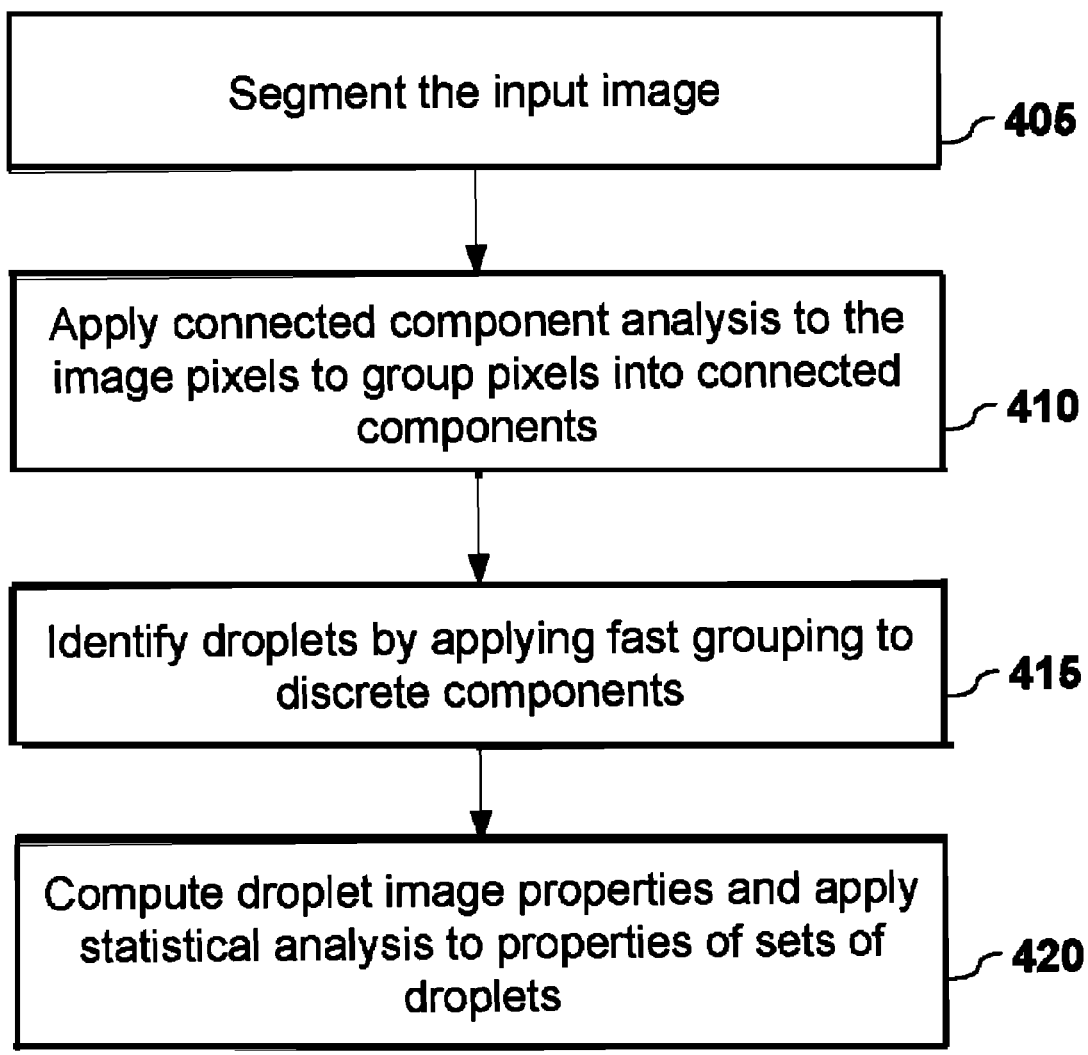
FIG. 4 depicts a method for analyzing an image of a printed dot pattern according to various embodiments of the invention.

FIG. 4 depicts a method 400, independent of structure, for analyzing an image of printed droplets according to various embodiments of the invention. In alternate embodiments, the analysis may be applied to shapes other than droplets such as lines or corners. In various embodiments of the invention, method 400 may be implemented by embodiments of droplet analyzer 120.

1. Image Segmentation

In step 405, image segmentation is performed on snapshot images of a printed dot pattern. In certain embodiments, the pixels of a snapshot image are classified into "foreground" (labeled as "1") and "background" (labeled as "0") regions. In embodiments, local thresholding techniques are used to perform segmentation. For example, a threshold may be calculated for each pixel in an image on the basis of information contained in a neighborhood of the pixel. The pixel's threshold value may be compared to the value of a calculated image threshold surface at the pixel's (x,y) location in order to determine the label assigned to the pixel. Those skilled in the art will recognize that there are other local thresholding methods that may be applied in order to perform segmentation, as well as other global thresholding methods.

In embodiments, the foreground pixels represent regions containing the printed dots from the dot pattern. The segmented images are called "binary segmented images" because each pixel may have a 1 label or a 0 label depending upon whether it was determined to be within a foreground region or a background region.

2. Connected Component Analysis

In step 410, connected component analysis is applied to the foreground pixels of a snapshot image in order to group pixels into discrete bounded regions called "components." In various embodiments of the invention, step 410 may be implemented by embodiments of connected component analyzer 315.

In certain embodiments, a Connected Component Analysis (CCA) is performed on each pixel within the image. One example of a CCA is to scan each row of pixels within an image, determining the component label of each pixel in a row. To determine the component label of a pixel, the principle of "8-connectivity" is applied so that the pixel's label is based on the labels of the 8 pixels within a 3-by-3 neighborhood surrounding the pixel. One skilled in the art will recognize that this is an example, and that various methods of CCA may be used on grayscale as well as color multi-layer images. In embodiments, a connected component is a bounded region enclosing a connected set of foreground pixels.

Figure 5A:
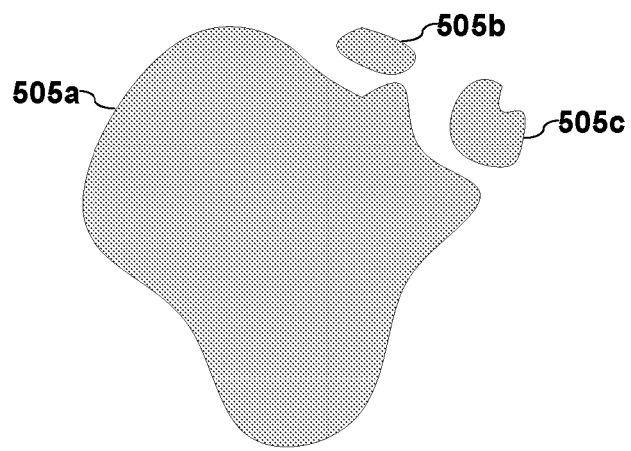
FIG. 5A illustrates an example of identified components from regions of connected foreground pixels according to various embodiments of the invention.

FIG. 5A illustrates an example of a result of CCA according to various embodiments of the invention. In the illustration, regions containing foreground pixels are colored, and three connected components (505a-c) have been identified.

3. Droplet Specification

The fast grouping analysis (step 415) is applied to labeled connected components in order to identify and label individual droplets including their possible splash. Step 415 may be implemented by embodiments of fast grouping analyzer 320 in various embodiments of the invention.

As previously discussed, splash may appear in a captured image of the droplet and is a result of an ink splash as a nozzle is rendering a dot. In embodiments using CCA, the splash may be labeled as a separate connected component. The components 505b and 505c depicted in FIG. 5A are examples of splash that are labeled as separate connected components.

Figure 5B:
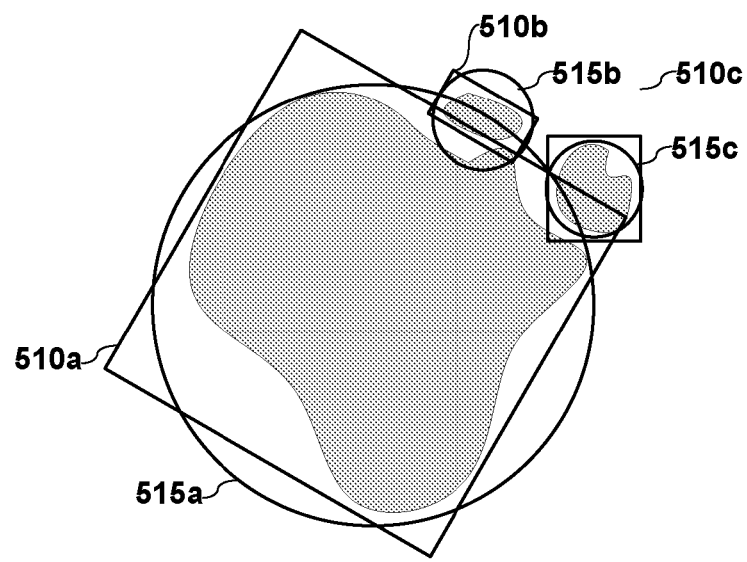
FIG. 5B illustrates an example of a minimum bounding rectangle and a minimum bounding circle fitted to each identified component according to various embodiments of the invention.

A "minimum bounding circle" and a "minimum bounding rectangle" may be fitted to a labeled component within an image. A "minimum bounding circle" is the minimum area circle among all circles enclosing a set of points plotted in 2 dimensions. A "minimum bounding rectangle" is the minimum area rectangle among all rectangles enclosing a set of points plotted in 2 dimensions. In embodiments, fitting a minimum bounding shape to a labeled component means finding the minimum bounding shape that encloses the pixels labeled as belonging to that component. FIG. 5B illustrates an example of a minimum bounding circle and a minimum bounding rectangle fitted to a labeled connected component according to embodiments of the invention. Each of the connected components 505a-c that is depicted in FIG. 5A is fitted with a minimum bounding rectangle (510a-c) and a minimum bounding circle (515a-c).

In various embodiments, a "fast grouping analysis" is performed in order to identify droplets. In a fast grouping analysis, an indexing grid is overlaid onto an image that has labeled connected components. Each connected component may have a label identifying the indexing grid cell to which it belongs as well as its identifying label. Adjacent connected components that have minimum bounding shapes that are within a threshold distance of each other may be associated into a single droplet. Using both the connected component labels and the indexing grid cell neighborhoods allows this analysis to be performed quickly. One skilled in the art will recognize that various dimensions of the grid and various distance threshold values may be used to perform a fast grouping analysis.

Figure 6:
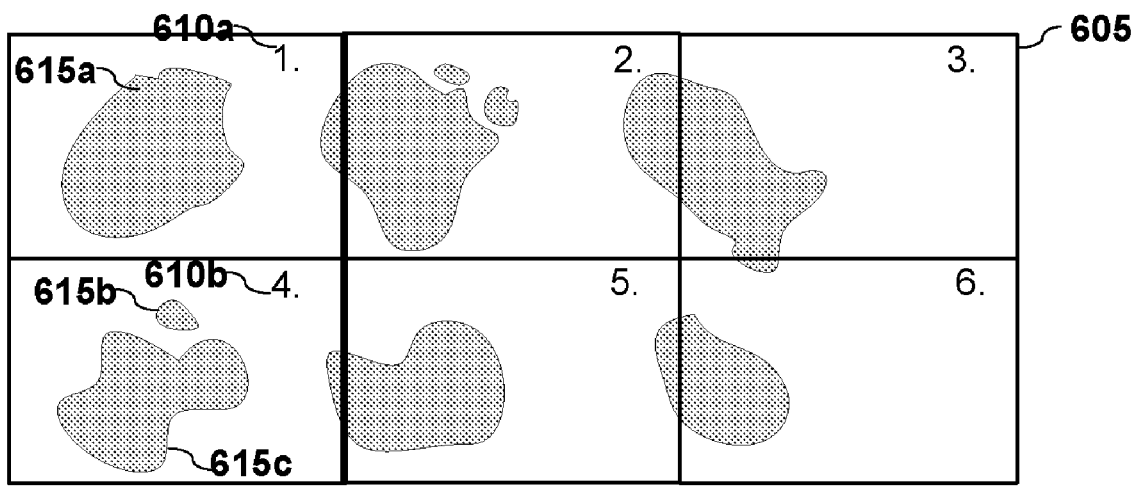
FIG. 6 illustrates an example of fast grouping of printed droplets according to various embodiments of the invention.

FIG. 6 illustrates an example of a fast grouping analysis applied to an image of printed droplets according to an embodiment of the invention. An indexing grid 605 is overlaid onto the image; 610a and 610b are two of the labeled grid cells. In an example fast grouping analysis, grid cell 610a would be found to contain one droplet, the connected component 615a, since there are no closely neighboring labeled connected components within the neighboring grid cells. Grid cell 610b also would be found to contain one droplet, the concatenation of connected components 615b and 615c. Connected component 615b may be determined to be splash since its distance to its adjacent neighbor connected component 615c is less than a distance threshold and both its minimum bounding rectangle and minimum bounding circle have areas that are smaller by a size threshold than the areas of the minimum bounding rectangle and minimum bounding circle that have been fitted to connected component 615c.

Figure 5C:
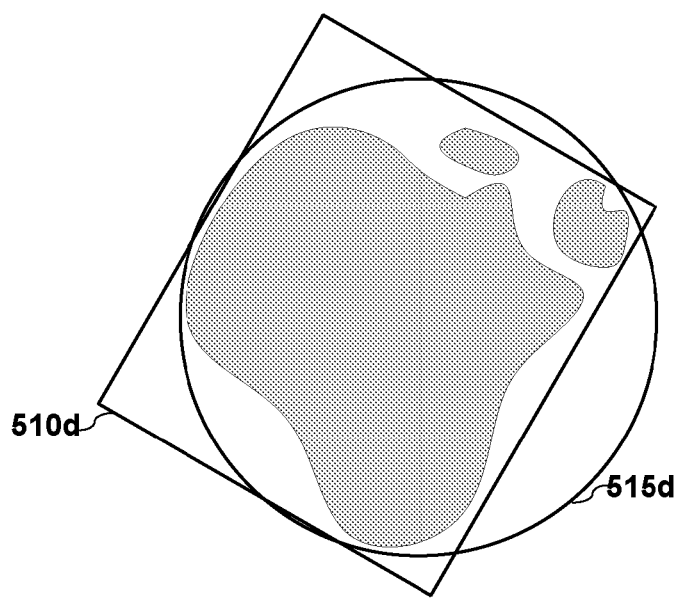
FIG. 5C illustrates an example of a minimum bounding rectangle and a minimum bounding circle fitted to a droplet composed of three concatenated components according to various embodiments of the invention.

In this example, a minimum bounding box and a minimum bounding rectangle are re-computed for a droplet that has been labeled as a result of CCA and fast grouping analysis. FIG. 5C illustrates an example of a minimum bounding rectangle 510d and a minimum bounding circle 515d that have been fitted to a droplet that was labeled as the concatenation of three connected components.

4. Statistical Analysis of Droplets

A droplet may be described in terms of its image properties. The droplet image properties may comprise "dot-coverage percentage" and "circularity." Dot-coverage percentage is the percentage of foreground pixels among the image pixels within the area of the minimum bounding circle that is fitted to a droplet. A larger dot coverage percentage may be interpreted to mean that less splash is associated with a droplet. Circularity is the width to height ratio of the minimum bounding rectangle that is fitted to a droplet. A droplet is more circular in shape if the circularity percentage is closer to 1.

In step 420, the image properties of the labeled droplets in an image of a printed dot pattern are calculated. In embodiments in which the droplets correspond to the printed dots produced by specific nozzles of an inkjet printer, a statistical analysis of the set of droplets associated with a printer nozzle may be performed in order to characterize the nozzle's signature in terms of statistical properties such as mean and standard deviation of each image property, for example. Step 420 may be implemented by droplet property analyzer 325.

Aspects of the present invention may be implemented in any device or system capable of processing the image data, including without limitation, a general-purpose computer and a specific computer intended for graphics processing. The present invention may also be implemented into other devices and systems, including without limitation, a digital camera, a printer, a scanner, a printer, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A method for characterizing a printed droplet within an image, the method comprising:

segmenting the image into foreground pixels and background pixels;

defining a plurality of connected components within the image by identifying bounded regions of adjacent foreground pixels;

identifying the printed droplet by associating a first connected component with a second connected component, both of which are in the plurality of connected components, if a distance between the first and second connected components is less than a threshold; and analyzing the printed droplet by quantifying at least one droplet image property, the at least one droplet image property comprising droplet circularity;

wherein quantifying the circularity for the printed droplet comprises:

calculating a minimum bounding rectangle for the pixels labeled as belonging to the printed droplet; and calculating the width to height ratio of the minimum bounding rectangle for the printed droplet.

2. A method for characterizing a printed droplet within an image, the method comprising:

segmenting the image into foreground pixels and background pixels;

defining a plurality of connected components within the image by identifying bounded regions of adjacent foreground pixels;

identifying the printed droplet by associating a first connected component with a second connected component, both of which are in the plurality of connected components, if a distance between the first and second connected components is less than a threshold; and analyzing the printed droplet by quantifying at least one droplet image property, the at least one droplet image property comprising dot coverage percentage;

wherein quantifying the dot coverage percentage for the printed droplet comprises:

calculating a minimum bounding circle for pixels labeled as belonging to the printed droplet; and calculating the percentage of the pixels labeled as belonging to the printed droplet among pixels of the image within the area of the minimum bounding circle.

3. The method of claim 2 wherein a connected component analysis defines the plurality of discrete components within the image.

4. A method for characterizing a printed droplet within an image, the method comprising:
- segmenting the image into foreground pixels and background pixels;
- defining a plurality of connected components within the image by identifying bounded regions of adjacent foreground pixels;
- identifying the printed droplet by associating a first connected component with a second connected component, both of which are in the plurality of connected components, if a distance between the first and second connected components is less than a threshold;
- analyzing the printed droplet by quantifying at least one droplet image property;
- partitioning the image into a plurality of grid cells; and
- characterizing at least one droplet in at least one grid cell within the plurality of grid cells.

5. The method of claim 4 wherein the first and second connected components are located within a neighborhood of a single grid cell within the plurality of grid cells.

6. A method for characterizing a printed droplet within an image, the method comprising:
- segmenting the image into foreground pixels and background pixels;
- defining a plurality of connected components within the image by identifying bounded regions of adjacent foreground pixels;
- identifying the printed droplet by associating a first connected component with a second connected component, both of which are in the plurality of connected components, if a distance between the first and second connected components is less than a threshold; and
- analyzing the printed droplet by quantifying at least one droplet image property;

wherein a plurality of droplets is characterized based on the at least one droplet image property.

7. The method of claim 6 further comprising calculating statistical properties across the plurality of characterized droplets in order to quantify a performance characteristic of a device that produced at least one droplet in the plurality of characterized droplets.

8. The method of claim 7 wherein the device is an inkjet printer.

9. A non-transitory computer readable storage medium storing computer executable instructions for performing the method of claim 1.

10. An apparatus for characterizing a printed droplet within an image comprising pixels, the apparatus comprising:
- an image segmenter, coupled to receive the image, that segments the image into foreground pixels and background pixels;
- a connected component analyzer, coupled to receive the image with labeled foreground pixels, that defines a plurality of connected components within the image by identifying bounded regions of adjacent foreground;
- a fast grouping analyzer, coupled to receive the image with a plurality of connected components, that identifies the printed droplet by associating a first connected component with a second connected component, both of which are in the plurality of connected components, if a distance between the first and second connected components is less than a threshold; and
- a droplet property analyzer, coupled to receive the printed droplet, that quantifies at least one droplet image property;

wherein a plurality of droplets is characterized based on the at least one droplet image property.

11. The apparatus of claim 10 wherein the at least one droplet image property comprises droplet circularity.

12. The apparatus of claim 10 wherein the at least one droplet image property comprises droplet dot coverage percentage.

* * * * *